United States Patent [19]

Ohta et al.

[11] Patent Number: 5,781,261

[45] Date of Patent: Jul. 14, 1998

[54] ACTIVE MATRIX TYPE LCD HAVING LIGHT SHIELD LAYERS AND COUNTER ELECTRODES MADE OF THE SAME MATERIAL

[75] Inventors: Masuyuki Ohta; Kazuhiko Yanagawa, both of Mobara; Katsumi Kondo, Hitachinaka; Masahito Ohe, Mobara, all of Japan

[73] Assignee: Hitachi, Ltd., Tokyo, Japan

[21] Appl. No.: 677,716

[22] Filed: Jul. 8, 1996

[30] Foreign Application Priority Data

Jul. 17, 1995 [JP] Japan ................... 7-179908

[51] Int. Cl.$^6$ .................. G02F 1/136; G02F 1/1333; G02F 1/1343
[52] U.S. Cl. .................. 349/111; 349/110; 349/143; 349/44
[58] Field of Search ............. 349/44, 110, 111, 349/143

[56] References Cited

U.S. PATENT DOCUMENTS

| | | | |
|---|---|---|---|
| 4,687,298 | 8/1987 | Aoki et al. | 349/110 |
| 4,869,576 | 9/1989 | Aoki et al. | 349/110 |
| 5,091,792 | 2/1992 | Kaida et al. | 349/111 |
| 5,598,285 | 1/1997 | Kondo et al. | 349/42 |
| 5,600,464 | 2/1997 | Ohe et al. | 349/138 |
| 5,615,028 | 3/1997 | Ishiguro et al. | 349/110 |
| 5,659,375 | 8/1997 | Yamashita et al. | 349/111 |

*Primary Examiner*—William L. Sikes
*Assistant Examiner*—Toan Ton
*Attorney, Agent, or Firm*—Antonelli, Terry, Stout & Kraus, LLP

[57] ABSTRACT

An active matrix type liquid crystal display comprising a liquid crystal layer containing liquid crystal molecules, a pair of substrates arranged to be facing each other with the liquid crystal layer interposed there between, a pair of polarizers arranged outside of the substrates, active elements composed of semiconductor active layers and insulating layers, having scanning electrodes and signal electrodes which are arranged between one of the pair of substrates and the liquid crystal layer, pixel electrodes formed between one of the pair of substrates and the liquid crystal layer and connected to the active elements, light shielding layers for preventing the active elements from being illuminated by incident light, and counter electrodes arranged on the same plane as the light shielding layers taking one of said pair of substrates as a pair of substrates and the active element, between the liquid crystal layer and the active element, or between another one of the pair of substrates and the liquid crystal layer, in a manner facing the scanning electrode of the active element.

4 Claims, 9 Drawing Sheets

ACTIVE MATRIX TYPE LCD HAVING LIGHT SHIELD LAYERS AND COUNTER ELECTRODES MADE OF THE SAME MATERIAL

BACKGROUND OF THE INVENTION

The present invention relates to an active matrix type liquid crystal display apparatus and a method for manufacturing the same; and more particularly, the invention relates to an active matrix type liquid crystal display apparatus which is suitable for driving liquid crystals using an in-plane switching method, wherein an electric field which is approximately parallel to the substrate is applied between a pixel electrode and a counter electrode, and to a method for manufacturing the same.

The active matrix type liquid crystal display apparatus using active elements has been used widely as a display terminal in office automation apparatus and other devices, because the liquid crystal display apparatus realizes a high picture quality in addition to having features of being thin and light in weight. The active matrix type liquid crystal display apparatus uses thin film transistors (TFT) as the active element, a semiconductor active layer of the thin film transistor being mainly composed of amorphous silicon (a-si). Generally, a liquid crystal display apparatus produces an image display on the display plane by modulating incident light and projecting the modulated light. However, the conventional liquid crystal display apparatus has a problem in that the contrast ratio of the image decreases when the amorphous silicon of the active element is exposed to strong light. This is the reason why the holding characteristics become worse with a decrease in the off-resistance of the amorphous silicon TFTs.

Therefore, in order to avoid exposing the active elements to incident light, a liquid crystal display apparatus having a light shield film for the active element has been disclosed, for instance, in JP-A-5-265038(1993) and JP-A-5-119350 (1993).

However, with the conventional art, such problems as an increase in the processing steps and a lowering of the productivity were generated, because the light shielding layer was manufactured by a process separate from the process for composing the electrodes of the TFTs, the pixel electrodes, and the counter electrode.

SUMMARY OF THE INVENTION

The object of the present invention is to provide an active matrix type liquid crystal display apparatus, which is capable of forming a light shield film for the active element concurrent with the process for forming the counter electrode.

In accordance with the present invention, a liquid crystal display apparatus comprises a liquid crystal layer containing liquid crystal molecules, a pair of substrates arranged so as to face each other with the liquid crystal layer being interposed therebetween, a pair of polarizers arranged exterior of the substrate, active elements composed of semiconductor layers, insulating layers, and electrodes, such as scanning electrodes and signal electrodes, which are arranged between one of the pair of substrates and the liquid crystal layer, pixel electrodes arranged between one substrate of the pair of substrates and the liquid crystal layer, which pixel electrodes are connected to the active elements, a light shielding layer arranged between the one of the substrates and the active element in a position facing the scanning electrode of the active element for preventing incident light from entering the active element, and a counter electrode arranged on the same plane with the light shielding layer.

In forming the above active matrix type liquid crystal display apparatus, members having the following function can be used as the light shielding layer and the counter electrode:

(1) A member provided with a light shielding layer arranged between the one of the substrates and the active element in a position facing the scanning electrode of the active element for preventing incident light from entering the semiconductor active layer in the active element, and a counter electrode arranged on the same plane with the light shielding layer.

(2) A member provided with a light shielding layer arranged between the liquid crystal layer and the active element in a position facing the scanning electrode of the active element for preventing incident light from entering the active element, and a counter electrode arranged on the same plane with the light shielding layer.

(3) A member provided with a light shielding layer arranged between the other one of the substrates and the liquid crystal layer in a position facing the scanning electrode of the active element for preventing incident light from entering the active element, and a counter electrode arranged on the same plane with the light shielding layer.

In forming the above respective active matrix type liquid crystal display apparatus, the following feature can be added:

(1) The active element may be composed of a thin film transistor having a staggered structure.

(2) The active element may be composed of a thin film transistor having an inverted staggered structure.

(3) The counter electrode and the light shielding layer may be connected electrically to each other.

(4) One part of the counter electrode may be formed in a region overlapping the signal electrode of the active element, and another part is wider then the region of the scan electrode.

(5) The counter electrode and the light shielding layer are composed of the same material.

(6) The counter electrode and the light shielding layer may be composed of an opaque material having less transparency than the respective transparent electrodes.

(7) The semiconductor active layer may be formed of amorphous silicon.

In accordance with the manufacturing method proposed by the present invention for manufacturing an active matrix type liquid crystal display apparatus, the light shielding layer and the counter electrode can be manufactured in the same processing step, the processing steps can be simplified, and contribution to improvement of productivity becomes possible, because the light shielding layer and the counter electrode can be formed on the same plane by adopting an in-plane switching method, wherein an electric field which is approximately parallel to the substrate is applied between a pixel electrode and a counter electrode.

The adoption of the in-plane switching method, in contrast to the method wherein an electric field is applied perpendicularly to the substrate, makes use of a transparent electrode, such as ITO (Indium-Tin-Oxide), for the counter electrode unnecessary, thereby making it possible to use an opaque material or a material having a low transparency for the counter electrode. That means that a metallic material having sufficient light shielding characteristics for the active element (a TFT using a-Si) can be used as the material for the counter electrode.

The counter electrode, differing from the pixel electrode, is not necessarily connected to the semiconductor active layer. Therefore, the counter electrode can be formed on another layer separate from the semiconductor active layer with an insulating film interposed therebetween, at an upper side or lower side of the semiconductor active layer. Consequently, the counter electrode can be used as the light shielding layer by adopting the in-plane switching method of nematic liquid crystals and forming the counter electrode with an opaque material.

BRIEF DESCRIPTION OF THE DRAWINGS

These and other objects, features and advantages of the present invention will be understood more clearly from the following detailed description with reference to the accompanying drawings, wherein.

DESCRIPTION OF THE PREFERRED EMBODIMENTS

Embodiment 1

Hereinafter, an embodiment of the present invention will be explained with reference to the drawings.

Figure 1:
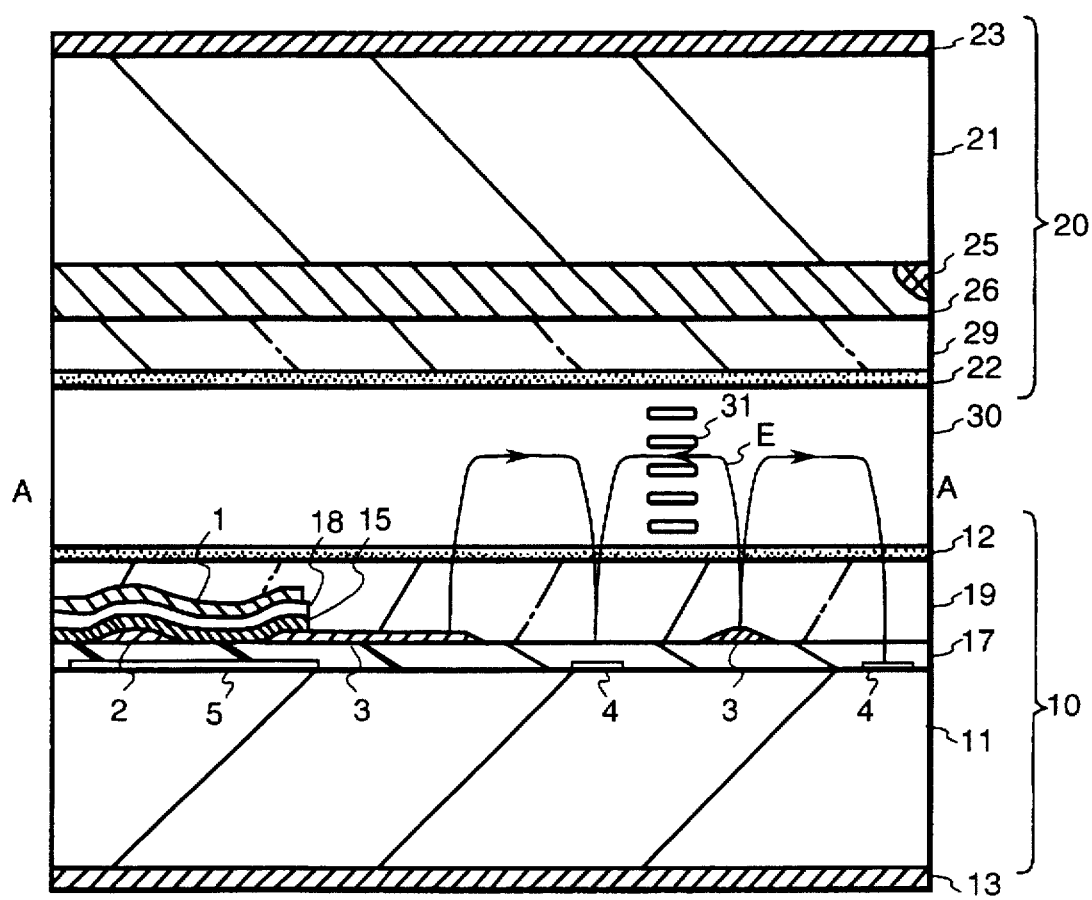
FIG. 1 is a schematic cross section of a pixel of an active matrix type liquid crystal display apparatus representing a first embodiment of the present invention.
Figure 2:
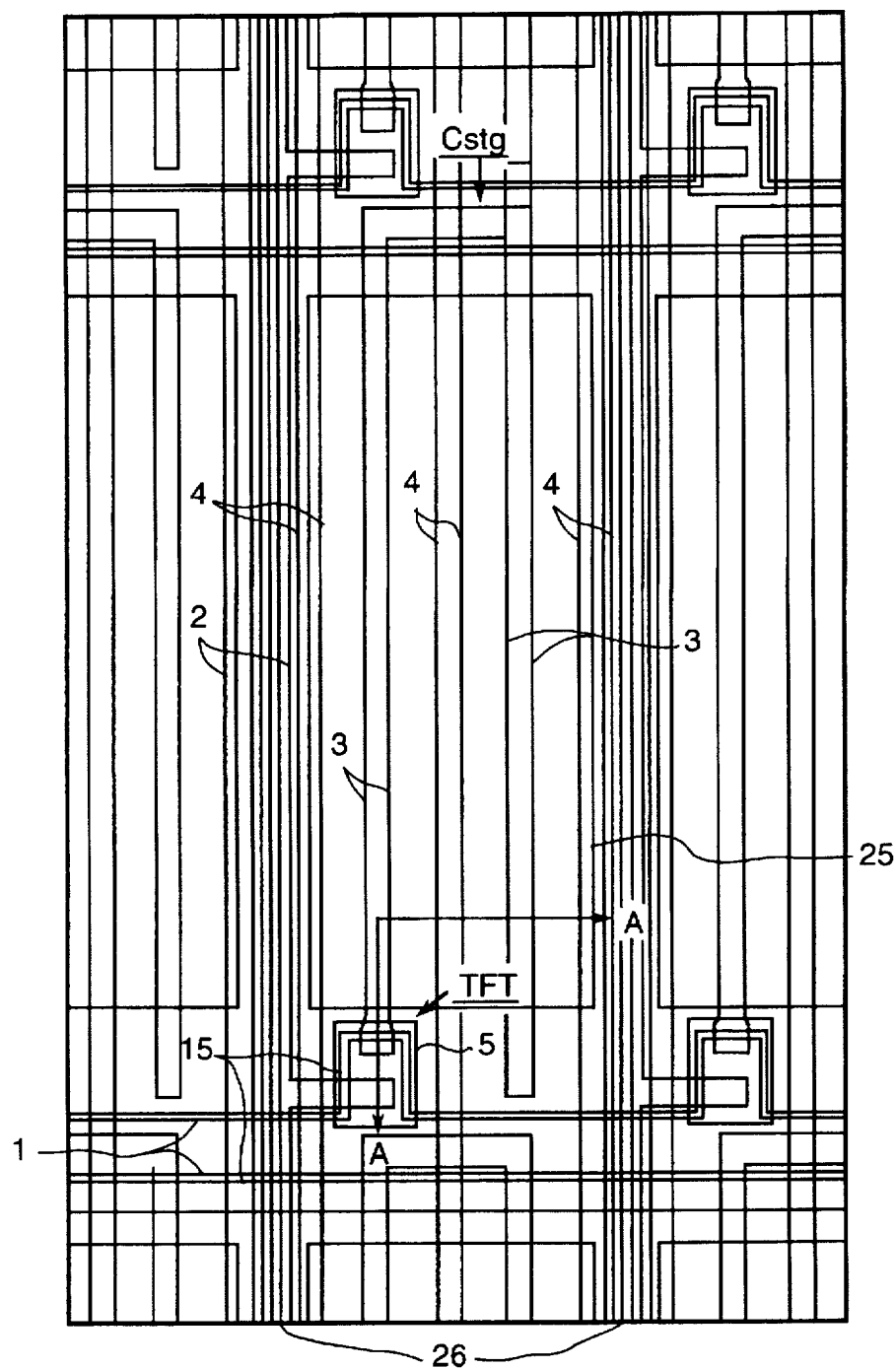
FIG. 2 is a schematic plan view of the pixel shown in FIG. 1.
Figure 3:
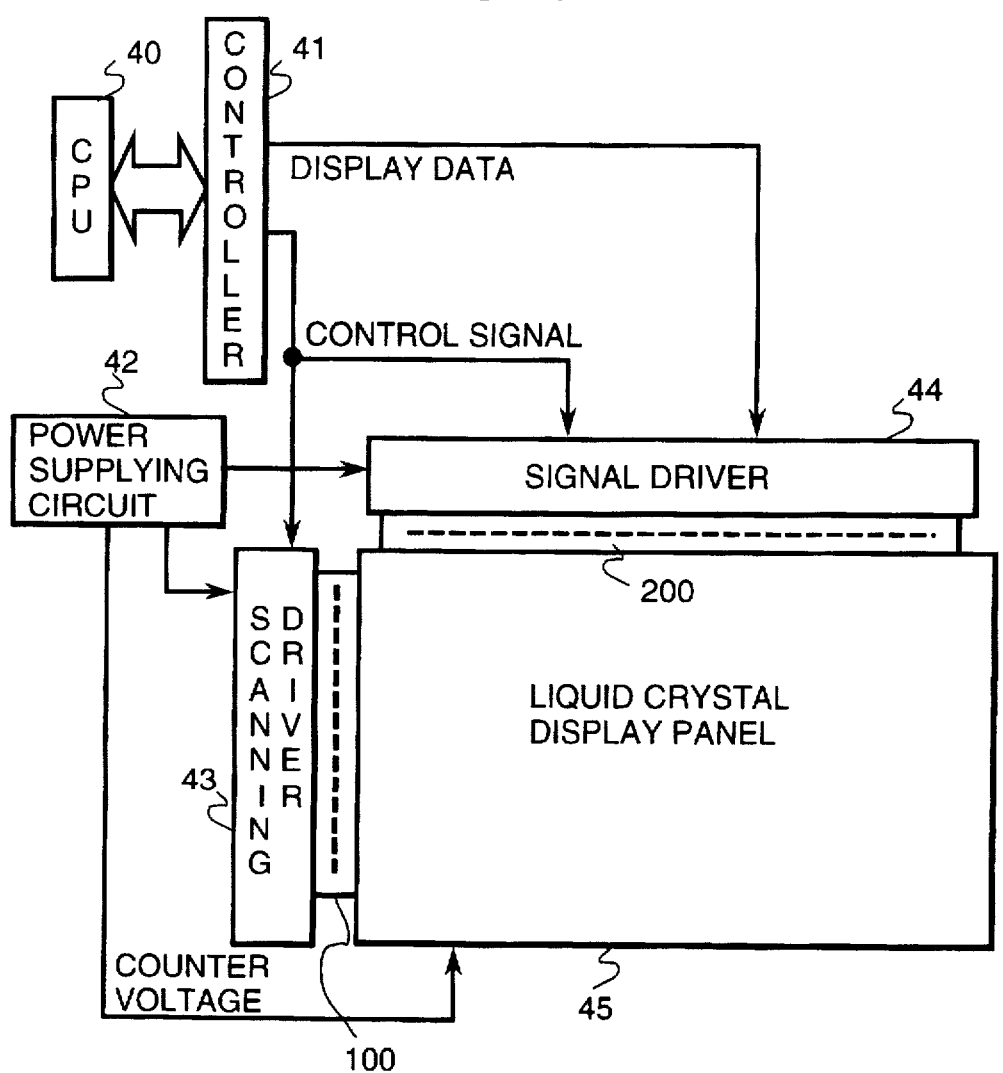
FIG. 3 is a schematic block diagram of the active matrix type liquid crystal display apparatus relating to the present invention.

FIG. 1 is a schematic cross section of a pixel of the active matrix type liquid crystal display apparatus representing a first embodiment of the present invention, FIG. 2 is a schematic plan view of the pixel shown in FIG. 1, FIG. 3 is a schematic illustration indicating a total system composition of the active matrix type liquid crystal display apparatus relating to the present invention.

Referring to FIG. 3, the liquid crystal display apparatus comprises CPU 40, controller 41, power supplying circuit 42, scanning driver 43, signal driver 44, and liquid crystal display panel 45. A plurality of thin film transistors (TFT) 6 are formed in the liquid crystal display panel 45 as active elements; the scanning electrode 1 of the respective thin film transistors 6 is connected to the scanning driver 43 via the scanning bus-line 100; and the signal electrode 2 is connected to the signal driver 44 via the signal bus-line 200.

When display data and control signals are generated by the CPU 40 based on image information, the display data are transmitted to the signal driver 44 via the controller 41, and the control signals are transmitted to the image signal driving circuit 44 and the scanning driver 43 via the controller 41.

When each of the thin film transistors 6 is arranged in a matrix, voltages are supplied in sequence to the scan electrodes 1 of the thin film transistors 6 in the respective rows, and the image signals according to the display data are supplied to the signal electrodes 2 of the thin film transistors 6 in the respective columns. Accordingly, an image is formed on designated pixels by on-off operation of the designated thin film transistors 6. In practice, the liquid crystal display panel 45 is composed as follows.

The pixel in the liquid crystal display panel 45 comprises, as shown in FIGS. 1 and 2, lower substrate layer 10, upper substrate layer 20, liquid crystal layer 30, and a pair of polarizers 13, 23. The lower substrate layer 10 and the upper substrate layer 20 are arranged so as to face each other with the liquid crystal layer 30 being interposed therebetween, and the polarizers 13, 23 are arranged so as to face each other on either side of the liquid crystal layer 30, the lower substrate layer 10, and the upper substrate layer 20.

The polarizers 13, 23 are formed so that the respective polarizing axes thereof are crossed with respect to each other, the polarizer 13 is pasted on the lower substrate layer 10, and the polarizer 23 is pasted on the upper substrate layer 20. The lower substrate layer 10 comprises glass substrate 11, gate insulator 17, passivation layer 19, and alignment layer 12. The gate insulator 17, the passivation layer 19, and the alignment layer 12 are laminated on the glass substrate 11.

On the other hand, the upper substrate layer 20 comprises glass substrate 21, black matrix 25, three color filters 26, over-coating layer 29 and alignment layer 22. The black matrix 25, the three color filters 26, the over-coating layer 29, and the alignment layer 22 are laminated on the glass substrate 21. The liquid crystal layer 30 is formed between the alignment layer 12 and the alignment layer 22 as a liquid crystal composition, and a plurality of liquid crystal molecules 30 are contained in the liquid crystal layer 30.

In order to form the thin film transistor 6 with a staggered structure in the present embodiment, signal electrode 2, semiconductor active layer 15, gate insulating film 18 and scanning electrode 1 are formed on the glass substrate 11. A plurality of pixel electrodes 3 are formed adjacent to the semiconductor active layer 15, and each respective pixel electrode 3 is connected to the semiconductor active layer 15. The signal electrode (drain electrode) 2, and the pixel electrode (source electrode) 3 are formed with the same material, such as chromium. The semiconductor active layer 15, the gate insulating film 18, and the scanning electrode 1 are formed with amorphous silicon, silicon nitride, and aluminum, respectively.

In accordance with the present embodiment, a plurality of counter electrodes 4 are formed on the glass substrate 11 so that an electric field E between the pixel electrode 3 and the counter electrode 4, which is approximately parallel to the substrate plane, is supplied to the liquid crystal layer 30.

Furthermore, in accordance with the present embodiment, the light shielding layer 5 is formed on the glass substrate 11 in order to prevent the incident light from the direction of the glass substrate 11 from entering the semiconductor active layer 15. In the above case, if the thin film transistor 6 is composed with a staggered structure, the incident light from the direction of the glass substrate 21 enters the thin film transistor 6, but the light is shielded by the scanning electrode 1. On the other hand, incident light from the direction of the grass substrate 11 may enter the semiconductor active layer, if the light shielding layer 5 is not provided. Therefore, the light shielding film 5 must be formed on the glass substrate 11. Furthermore, the light shielding layer 5 and the counter electrode 4 can be formed in the same processing step, since the light shielding layer 5 can be formed on the glass substrate 11 at the same time as the counter electrode 4. Additionally, the counter electrode 4 also can be formed with a shielding material, in addition to provision of the light shielding layer 5, such as an opaque metal having a small light transparency, since the counter electrode 4 is not necessarily used as a transparent electrode. The lower substrate layer 10 having the above composition can be formed by the following process in the present embodiment. In accordance with the present embodiment, a plurality of the counter electrodes 4 are formed on the transparent glass substrate 11, having a surface which is polished, in the same processing step as the light shielding layer 5 during the forming of the thin film transistor elements 6 having the staggered structure. The above formation of the counter electrode comprises the steps of spattering aluminum, patterning photoresist material by lithography, etching the metal, and eliminating the photoresist material.

Subsequently, the gate insulator 17 (made of silicon nitride in the present embodiment) is formed by a chemical vapor deposition (CVD) method, and then, the signal electrode 2 (drain electrode) and the pixel electrode 3 (source electrode) are formed simultaneously in the same step with the same material (chromium in the present embodiment). The formation of the signal electrode and the pixel electrode can be performed by the same steps as the case of the counter electrode 4.

At this step, the pixel electrode 3 and the counter electrode 4 are formed on the same glass substrate 11 in order to apply an electric field E, which is approximately in parallel to the surface of the glass substrate 11, to the liquid crystal layer 30. The semiconductor active layer 15, the gate insulating film 18 (silicon nitride), and the scanning electrode 1 (gate electrode:aluminum) are sequentially formed on the glass substrate 11. Phosphorous is doped into the semiconductor active layer 15 in order to effect ohmic contact among the semiconductor active layer 15, the signal electrode 2 and the pixel electrode 3.

The gate insulating film 18, the semiconductor active layer 15, and the scanning electrode 1 are manufactured simultaneously with a mask and a photo-step in order to reduce the required number of manufacturing steps. At this moment, the thin film transistors 6 and storage capacitances Cstg are formed. The storage capacitance Cstg is composed of a capacitance between the pixel electrode 3 and the scanning electrode 1 of a prior row, using the gate insulating film 18 as a dielectric film, and of another capacitance between the pixel electrode 3 and the counter electrode 4 using the gate insulator 17 as a dielectric film similar to the former capacitance. Subsequently, the passivation layer 19 (silicon nitride) is formed, and finally, the alignment layer 12 is applied.

On the other hand, the upper substrate layer 20 whereon the color filters and others are located, is formed in the following order.

First, an insulating black matrix 25 (referred to as a black matrix in order to distinguish it from the light shielding layer for the thin film transistor element) is formed on the transparent glass substrate 21, the surface of which is polished. The black matrix 25 is arranged at a position which coincides with an unnecessary space on the lower substrate layer 10 (except for the space between the pixel electrode 3 and the counter electrode 4) when the substrate layer 10 and the substrate layer 20 are arranged in facing relationship to each other. This is to prevent the contrast from decreasing by using the unnecessary transparent space. The three color filters 26 of R (red), G (green), and B (blue) in strip shapes are formed on the black matrix along the longitudinal direction of the signal electrode 2. On the color filter 26, the over coating layer 29 made of transparent resin for flattening the surface of the filter is formed, and finally the alignment layer 22 is applied on the outermost surface.

Subsequently, rubbing treatment for orienting the initial direction of the liquid crystal molecules 31 is performed on the alignment layers, which are applied on the glass substrates 11, 12, and the liquid crystal layer 30 is formed by assembling the substrate layers 10, 20 in a facing manner, reducing pressure between the substrate layers 10, 20, and enclosing the liquid crystal composition into the space between the substrate layers 10, 20. Both outer sides of the substrate layers 10, 20 interposing the liquid crystal layer 30 are provided with respective polarizers 13, 23 to compose the liquid crystal display panel 45.

In accordance with the present embodiment, the light from the direction of the grass substrate 11 is shielded by the light shielding layer 5, and the semiconductor active layer 15 is not exposed to the light, because the light shielding layer 5 is formed with the same material and in the same layer as the counter electrode 4, which is formed at a lowermost layer on the glass substrate 11, in a region at a lower portion of the semiconductor active layer 15. The light from the direction of the grass substrate 21 is shielded by the scanning electrode 1, and the semiconductor active layer 15 is not exposed to the light. Thus, in forming a structure wherein the semiconductor active layer 15 is held between the light shielding layer 5 and the scanning electrode 1, it becomes possible to prevent the semiconductor active layer 15 from being exposed to light even if the incident light comes from the directions of either of the substrate layers 10 or 20.

The pixel electrode 3 and the counter electrode 4 can be composed of an opaque material because, by using the in-plane switching method, the incident light comes into the liquid crystal layer 30 through an interval between the pixel electrode 3 and the counter electrode 4. The counter electrode 4, as opposed to the pixel electrode 3, need not necessarily connect with the semiconductor active layer 15, and so it can be formed in a different layer from the semiconductor active layer 15 with the gate insulator 17 interposed therebetween. Therefore, the counter electrode 4 can be arranged at the lowermost layer on the glass substrate 11. Furthermore, because the counter electrode 4 can be composed of a metal which has a sufficient conductivity as an electrode and a light shielding property, the counter electrode 4 can be formed with the same material and at the same processing step with the light shielding layer 5.

Accordingly, the forming processes of the light shielding layer 5 and the counter electrode 4 of the thin film transistor 6 can be unified, and the manufacturing process can be simplified without deteriorating the light shielding property entirely.

A detailed condition of the present embodiment will be explained hereinafter.

The number of dots was 640 (horizontal direction)×480 (vertical direction). The one dot was composed of three primary colors, RGB, pixel pitch was 110 μm (horizontal direction), and 330 μm (vertical direction). The space between the pixel electrode 3 and the counter electrode 4 in a pixel was divided into four regions. The widths of the electrodes were set as 10 μm for the signal electrode 2, and 6 μm for the pixel electrode 3 and the counter electrode 4. The interval between the pixel electrode 3 and the counter electrode 4 was 16 μm. The sizes of the element of the thin film transistor 6 were set as 6 μm/6 μm for the width of channel/length of channel, and the capacity of the storage capacitance Cstg was designed to be 100 fF. The thickness of the respective members were set as 1.1 mm for the glass substrates 11 and 21, 200 nm for the counter electrode 4, 300 nm for the gate insulator 17, 100 nm (Cr) for the signal electrode 2 and the pixel electrode 3, 50 nm for the semiconductor layer 15, 350 nm for the gate insulating film 18, 300 nm for the scanning electrode 1, 600 nm for the passivation layer 19, 1.2 μm for the black matrix 25, 2 μm for the colored filter 26, 2 μm for the over coating layer 29, and 90 nm for the alignment layers 12 and 22. The directions of the rubbing et the upper and lower boundaries were in parallel to each other, and had an angle of 75 degrees ($\phi LCL=\phi LC2=75°$) to the direction of the supplied electric field. A nematic liquid crystal composition having a positive dielectric anisotropy $\Delta\epsilon$ of 7.3(1 Khz) and an anisotropy of reflective index of 0.073(589 nm, 20°) was used for the liquid crystal composition 30. A gap d between the substrates was retained at 4.1 μm with the liquid crystal enclosing condition by inserting dispersed spherical polymer beads between the substrates. The black matrix 25 used was composed of a resist material containing pigments and a small amount of carbon.

Aluminum (Al) was used as the material for the counter electrode 4 in the present embodiment. However, equivalent advantages as the present embodiment can be obtained with another metallic material having a light shielding property and electric conductivity, such as Cr, Mo, Al, Ti, Ta, and their alloys. Amorphous silicon was used as the material for the semiconductor active layer in the present embodiment.

However, an active element made of any optically reactive material is applicable, and contained in the category of the present invention. The liquid crystal material used in the present embodiment is not particularly restricted, and a liquid crystal having negative dielectric anisotropy is also usable. In accordance with the present embodiment, the light shielding layer 5 and the counter electrode 4 can be manufactured in the same processing step. As a result, the processing steps can be simplified, and the productivity can be improved.

Embodiment 2

In accordance with the present embodiment, almost all of the semiconductor active layer 15 is shielded from light, and the other composition is the same as the embodiment 1.

Figure 4:
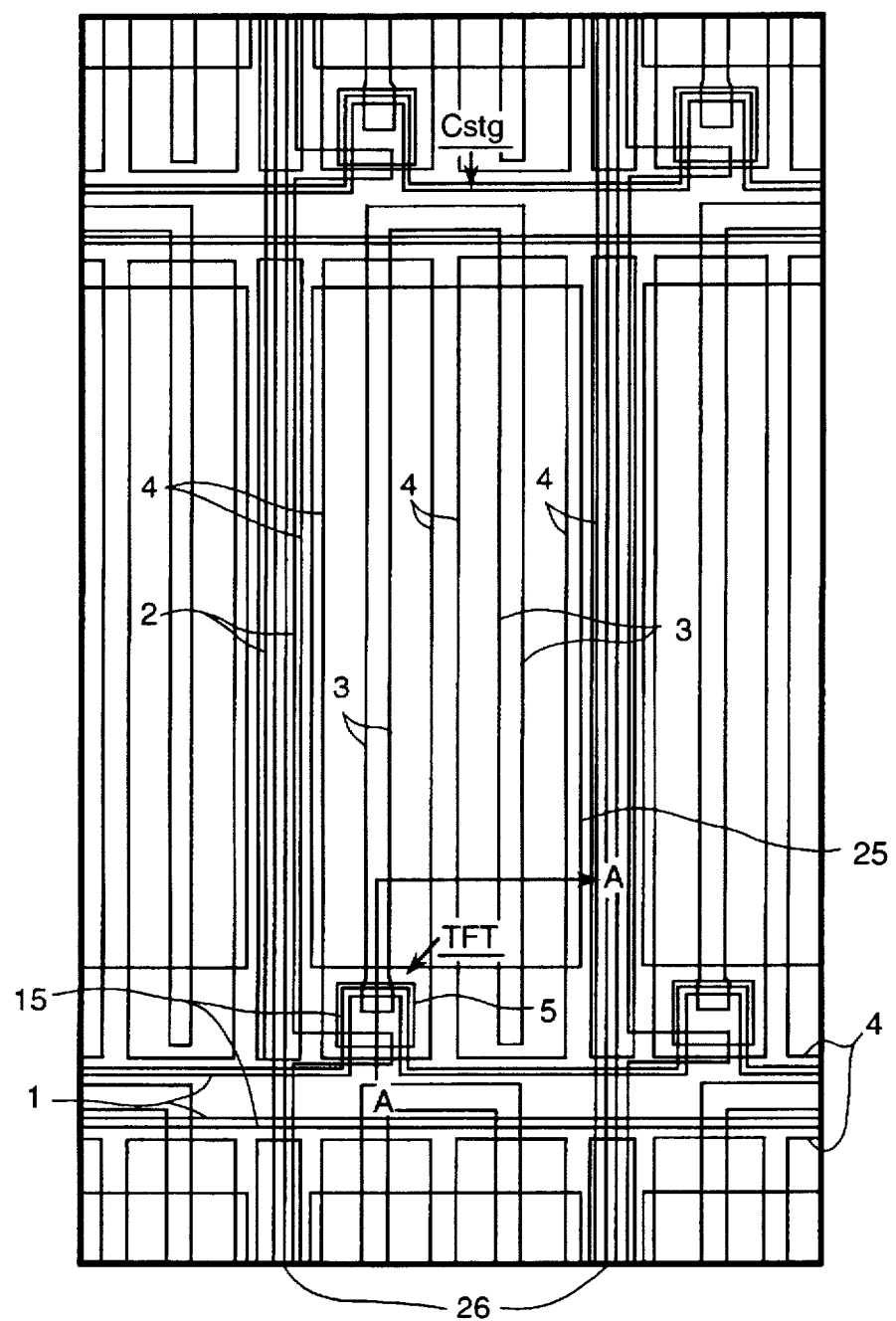
FIG. 4 is a schematic plan view of a pixel of the active matrix type liquid crystal display apparatus representing a second embodiment of the present invention.

A plan view of the pixel composition of the present embodiment is shown in FIG. 4. In accordance with the embodiment 1, a thin film transistor 6 having a staggered structure was formed, and the gate insulating film 18, the semiconductor active layer 15, and the scanning electrode 1 were manufactured simultaneously in a photo process. Therefore, the semiconductor active layer existed in all portions under the scanning electrode 1. On the contrary, almost all of the semiconductor active layer 15, which was formed at the portion under the scan electrode, in the present embodiment, was held between the scanning electrode 1 and the light shielding layer 5 or between the scanning electrode; and the courter electrode 4, in addition to the same composition as the embodiment 1.

Accordingly, a photo-Leakage current between the storage capacitance Cstg portion of the pixel electrode 3 and the signal electrode 2 can be reduced. Therefore, more preferable holding characteristics can be obtained, and the contrast ratio of the image can be improved.

In accordance with the present embodiment, the holding characteristics can be improved in addition to the advantages of the embodiment 1.

Embodiment 3

Figure 5:
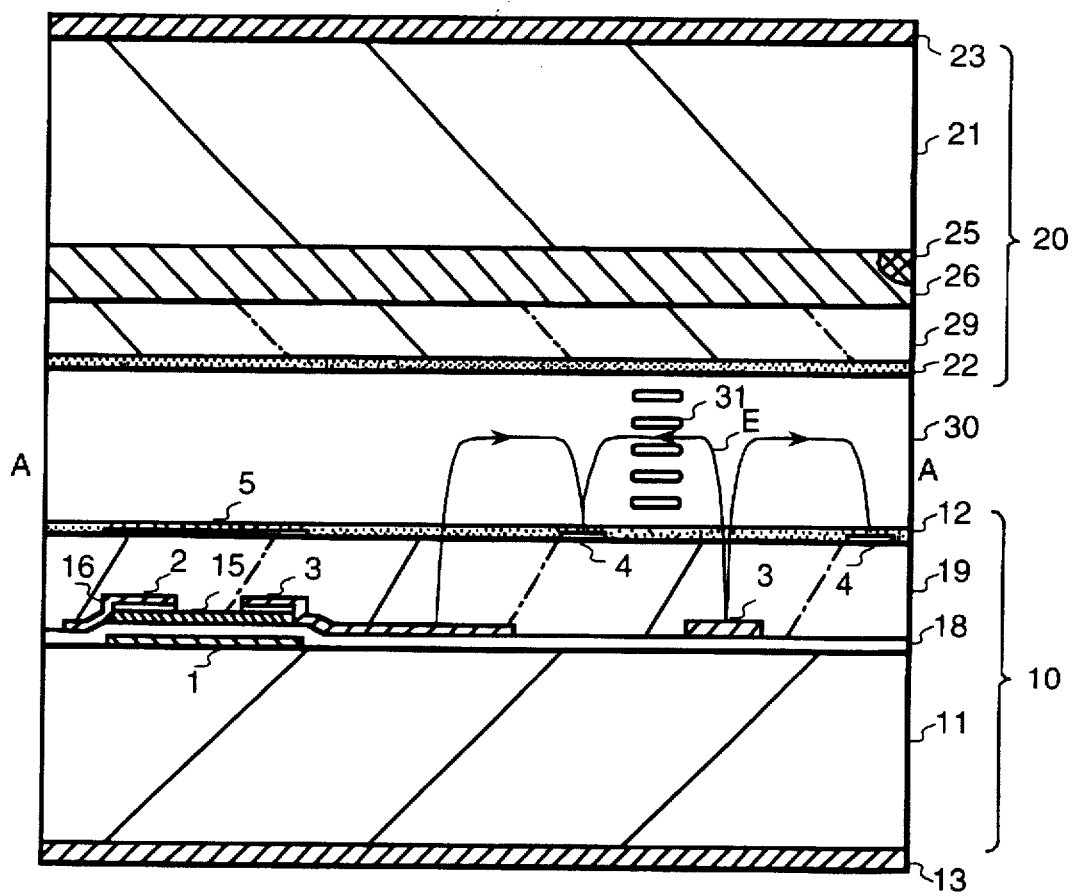
FIG. 5 is a schematic cross section of a pixel of the active matrix type liquid crystal display apparatus representing a third embodiment of the present invention.
Figure 6:
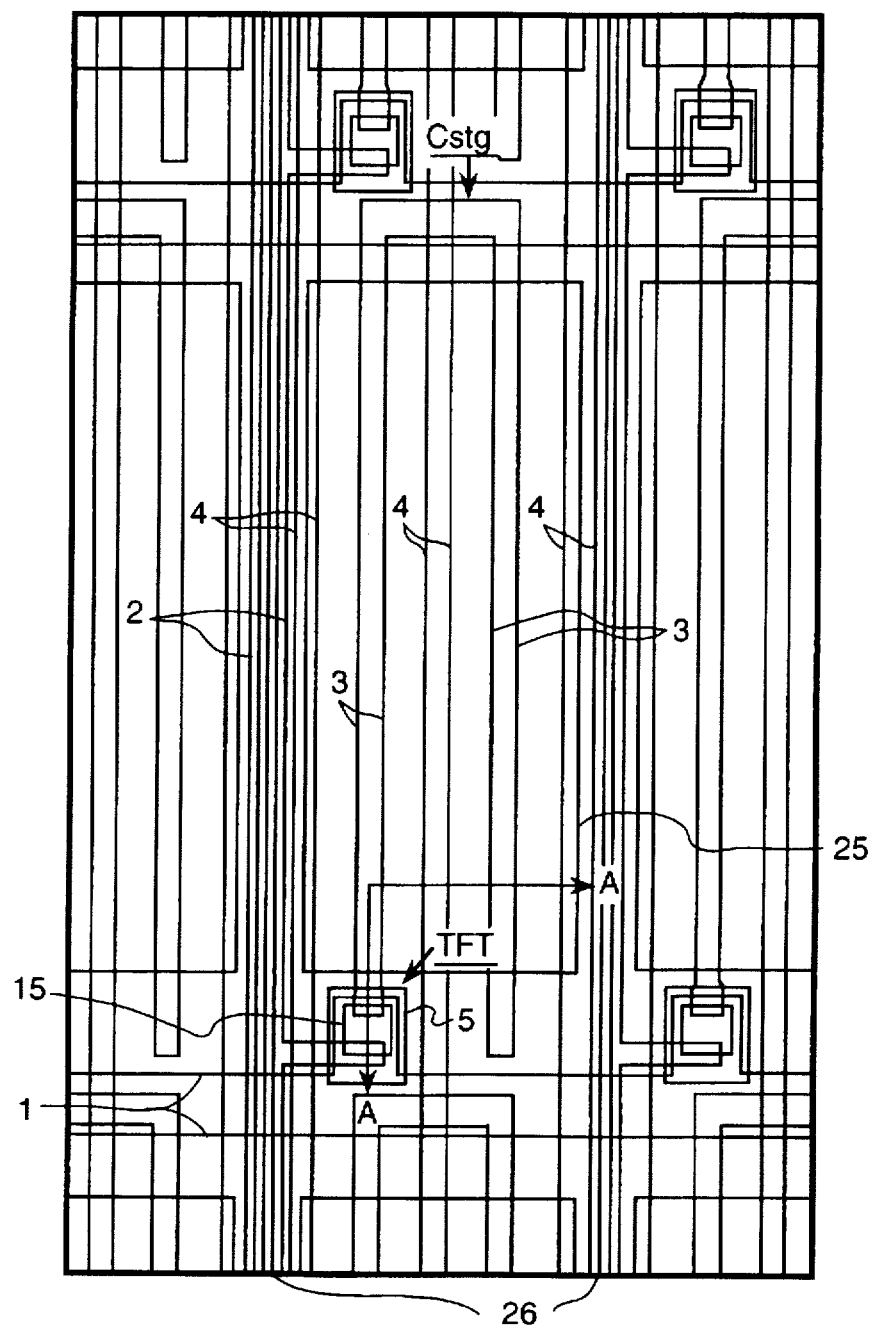
FIG. 6 is a schematic plan view of the pixel shown in FIG. 5.

In accordance with the present embodiment, the thin film transistor 6 had an inverted stagger structure, as shown in FIGS. 5 and 6, the counter electrode 4 and the light shielding layer 5 were formed between the passivation layer 9 and the alignment layer 12, and the other composition was the same as the embodiment 1. FIG. 5 is a cross section taken along the A—A line in FIG. 6.

The black matrix 25 in the present embodiment must have an insulating property or a low electric conductivity in order not to perturb the horizontal electric geld which is generated between the pixel electrode 3 and the counter electrode 4. In order to improve the contrast ratio of the image to more than 50, if only unnecessary space (a space excepting the space between the pixel electrode 3 and the counter electrode 4) must be shielded from light, the optical density ($=-\log(I/I_0)$, I: Intensity of transmitted light, $I_0$: Intensity of incident light) may be at least 1.7. However, if the optical density is 1.7, sufficient light shielding characteristics in shielding the thin film transistor 6 by the black matrix 25 can not be obtained because strong incident light comes from the direction of the substrate 21. On the contrary, if a large amount of carbon and other additives are mixed into the black matrix 25 for increasing the optical density, the additives increase the electric conductivity and the black matrix can not be used in the display method of the present embodiment.

Therefore, the following composition was used in the present embodiment.

The substrate layer 10, whereon the thin film transistor and other members are mounted, is formed by the following process in the present embodiment.

In forming a thin film transistor 6 having an inverted staggered structure in the present embodiment, the scanning electrode 1 (gate electrode: made of aluminum (Al) in the present embodiment) is formed on the transparent glass substrate 11, the surface of which is polished. The order of forming the scanning electrode 1 is the same as the embodiment 1.

Subsequently, the gate insulating film 15 (silicon nitride in the present embodiment) is formed, whereon the semiconductor active layer 15 (amorphous silicon in the present embodiment) is formed by a CVD process, and whereon the signal electrode 2 (drain electrode) and the pixel electrode 3 (source electrode) are formed with the same material (a two layers structure of aluminum (Al)/chromium (Cr) in the present embodiment) at the same processing step. At this moment, the pixel electrode 3 is composed so as to supply an electric field, which is in parallel to the substrate plane, to the liquid crystal layer 30 with the counter electrode 4, as will be explained later. A phosphor doped amorphous silicon layer 16 is formed between the semiconductor active layer 15 and the signal electrode 2 and the pixel electrode 3, in order to make ohmic contacts. At this point, the formation of the thin film transistor 6 element is completed. Subsequently, the passivation layer 19 (silicon nitride in the present embodiment) is formed.

Furthermore, the counter electrode 4 and the light shielding layer 5 are formed on the passivation layer 19 with the same material at the same processing step. Finally, the alignment layer 12 is applied on the outermost surface.

The storage capacitance Cstg is composed of the capacitance formed with the pixel electrode 3, the scanning electrode 1 of a prior row and the gate insulating film 18, and by the capacitance formed with the pixel electrode 3, the counter electrode 4 and the passivation layer 19.

In accordance with the present embodiment, the light shielding layer 5 is formed in a region at the upper portion of the semiconductor active layer 15 with the same material and at the same time as the counter electrode 4, and so it is possible to position the semiconductor active layer 15 between the light shielding layer 5 and the scanning electrode 1. Therefore, the semiconductor active layer 15 is not exposed to light, even if the light comes from either of the directions of the substrates 11 or 21. Particularly, the advantages is significant when the incident light comes from the direction of the substrate 21, which has the color filters. In this regard, the counter electrode is made of aluminum, the same as in the embodiment 1, and its light shielding property and conductivity is sufficient for practical use.

As explained above, by using the light shielding layer 5 formed with the same material at the same processing step as the counter electrode 4, sufficient light shielding characteristics can be obtained without increasing the number of the processing steps, even if the optical density of the black matrix 25 is low.

The black matrix 25 of the present embodiment was composed of resist material containing a pigment and a small amount of carbon. However, the same advantages as the present embodiment can be obtained with a black matrix having smaller light shielding characteristics than the present embodiment.

Embodiment 4

Figure 7:
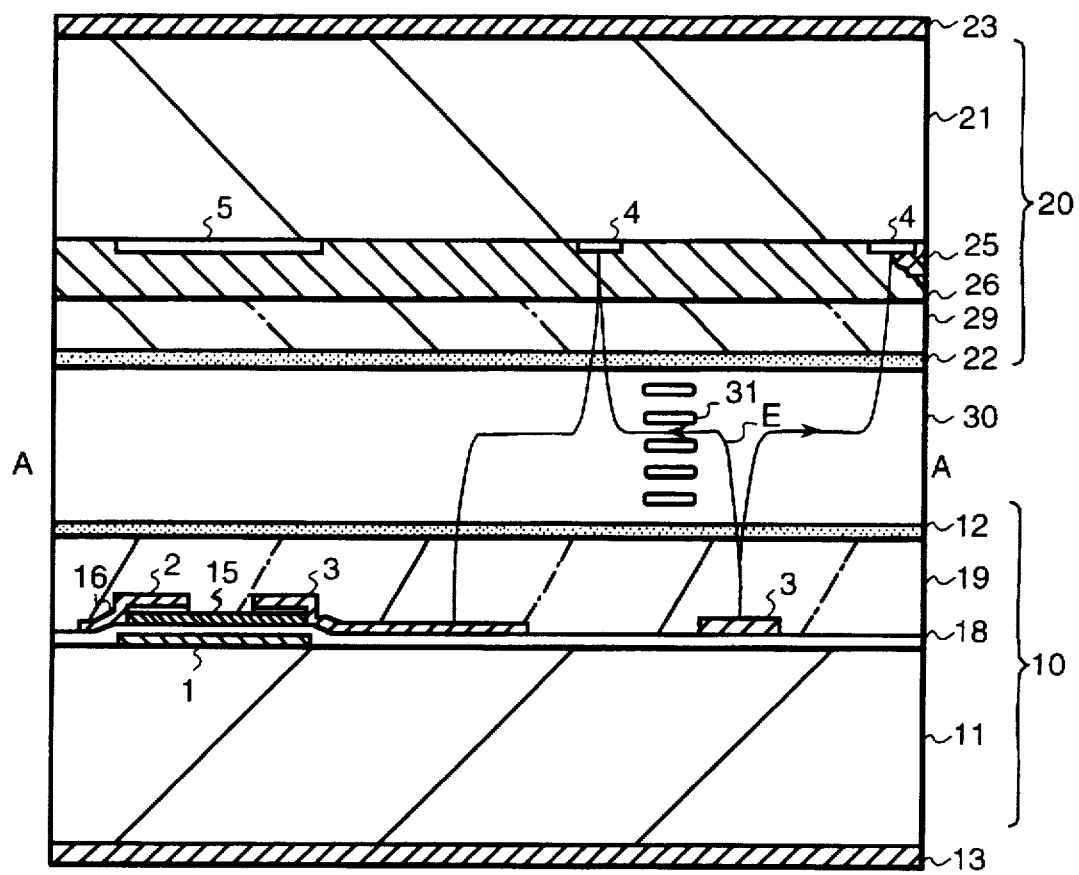
FIG. 7 is a schematic cross section of a pixel of the active matrix type liquid crystal display apparatus representing a fourth embodiment of the present invention.

In accordance with the present embodiment, the thin film transistor 6 was composed with an inverted staggered structure as shown in FIG. 7, in which the counter electrode 4 and the light shielding layer 5 were formed on the substrate 21, and the other aspects of the composition were the same as the embodiment 3.

The upper substrate layer 20, whereon the color filters and other members are mounted, is formed by the following process in the present embodiment.

The counter electrode 4 and the light shielding layer 5 are formed on the transparent glass substrate 21, the surface of which is polished, by the same processing step. Subsequently, the insulating black matrix 25 is formed.

Furthermore, the color filters 26 of three primary colors, R (red), G (green), and B (blue), are formed thereon.

The over-coating layer 29 made of transparent resin for flattening the surface is formed on the color filter 26, and finally the alignment layer 22 is applied thereon. In accordance with the present embodiment, as explained above, the same advantages as the embodiment 3 can be obtained.

Furthermore, any shortage failure between the electrodes can be reduced because the interval between the counter electrode 4 and the pixel electrode 3 is increased, and accordingly, the production yield is increased. At the same time, the capacitance formed between the counter electrode 4 and the other electrodes, such as the pixel electrode 3, is decreased, and the load on the circuit can be decreased.

Embodiment 5

Figure 8:
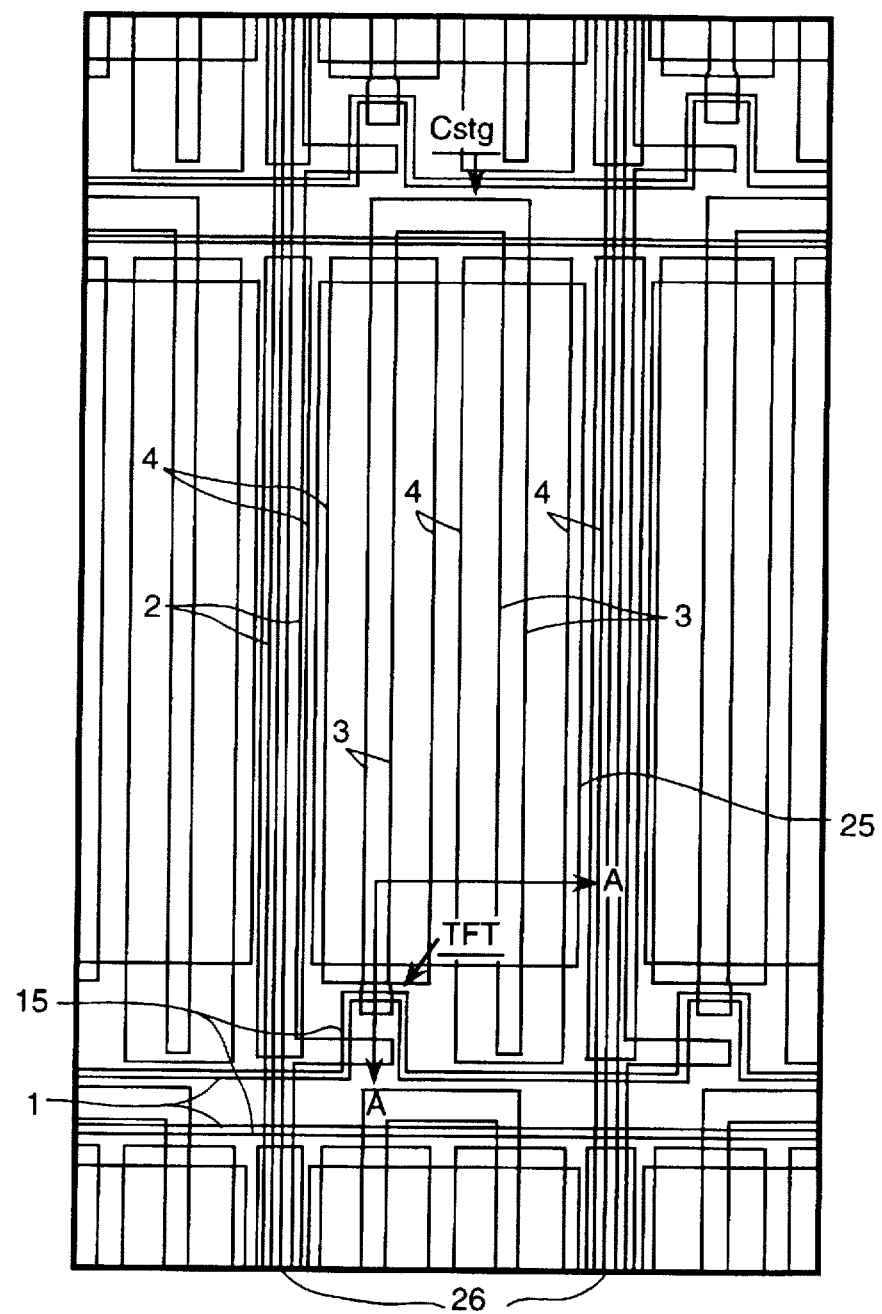
FIG. 8 is a schematic plan view of a pixel of the active matrix type liquid crystal display apparatus representing a fifth embodiment of the present invention.

In accordance with the present embodiment, the light shielding layer 5 and the counter electrode 4 are connected electrically as shown in FIG. 8, and the other aspects of the composition are the same as the embodiment 1.

The counter electrode 4 and the light shielding layer 5 are integrated in the present embodiment. Thus, the light shielding layer 5 is connected electrically to the counter electrode 4 to form a single member.

Accordingly, the back-channel potential (the potential of the semiconductor active layer 15 at an opposite side to the scanning electrode 1) of the thin film transistor 6 is determined by the potential of the counter electrode 4, which is integrated with the light shielding layer 5, and the back-channel potential of respective thin film transistors 6 becomes the same. Accordingly, any fluctuation of threshold voltages (a voltage of the scanning electrode 1, which makes the thin film transistor 6 an on-condition) among elements of the respective thin film transistors 6 can be suppressed. As a result, fluctuation of the voltage supplied to the liquid crystal is suppressed, and a problem of inconsistency (fluctuation) of the display brightness can be solved.

In accordance with the present embodiment, as explained above, the same advantages as the embodiment 1 can be obtained, and additionally,the advantage of suppressing the fluctuation of the display brightness can be obtained.

Embodiment 6

Figure 9:
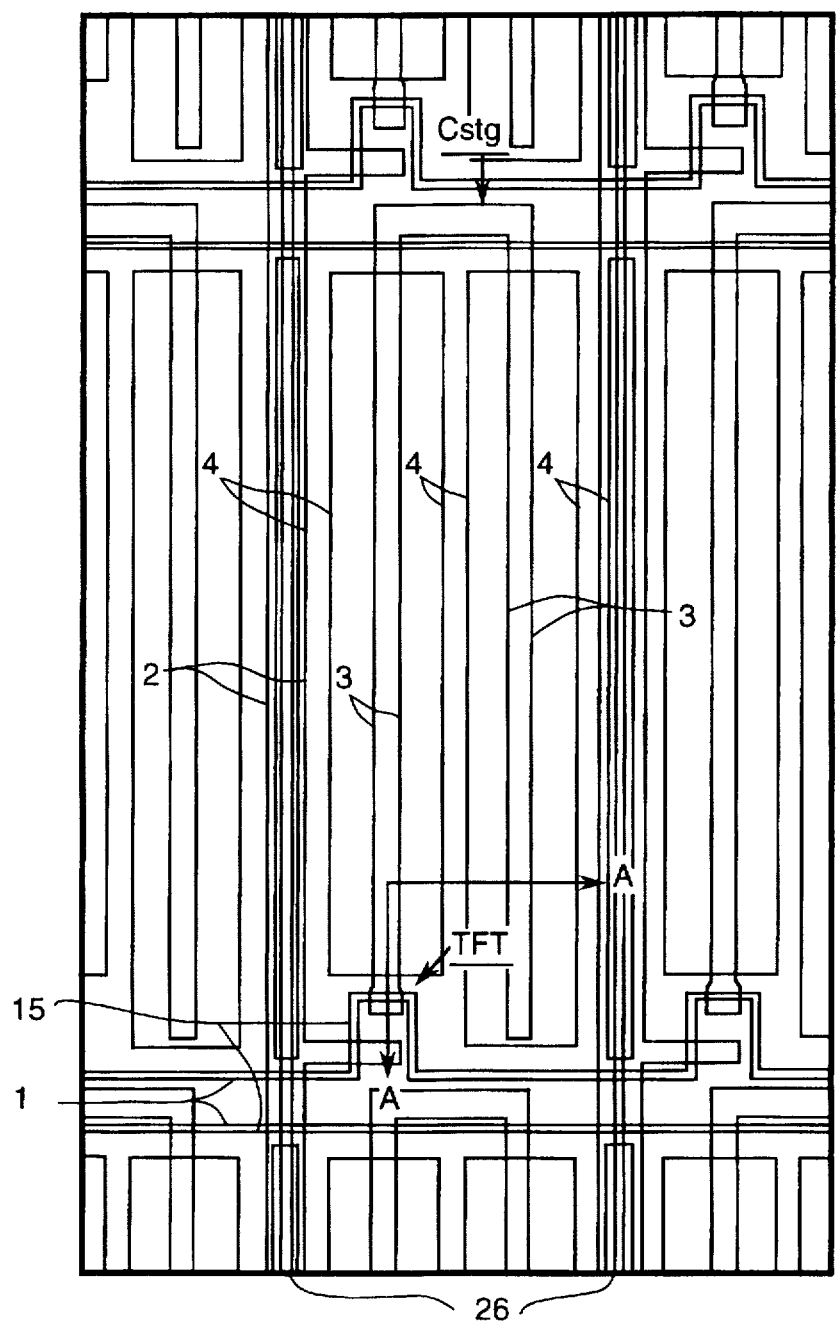
FIG. 9 is a schematic plan view of a pixel of the active matrix type liquid crystal display apparatus representing a sixth embodiment of the present invention.

In accordance with the present embodiment, a part of the counter electrode 4 is formed in a region, which is overlapped by the signal electrode 2 taking a perpendicular line between the substrate 11 and the substrate 21 as a standard, wider than the scanning electrode 1 as shown in FIG. 9. Other aspects of the composition of the present embodiment are the same as the embodiment 1.

In a plan structure of the pixel, the counter electrode 4 is formed on the whore region, which is a region from the boundary surrounded by the signal electrode 2 and the scanning electrode 1 to inside the boundary at least 6 µm. That means that the signal electrode 2 and a pert of the courter electrode 4 are overlapped in a region along the longitudinal direction of the signal electrode 2, and the width of the counter electrode 4 is set to be broader than the width of the scanning electrode 1 in a region along the longitudinal direction of the scanning electrode 1 to extend the counter electrode 4 from both sides of the scanning electrode 1. Accordingly, any transparent space other than the space between the pixel electrode 3 and the counter electrode 4 can be eliminated, and the low conductive black matrix 25 used in the embodiments 1–4 becomes unnecessary, because unnecessary light transmission does not exist.

In the present embodiment, the counter electrode 4 is formed in a region from the boundary to 6 µm inside the boundary. The width is a necessary electrode width for terminating at least 90% of the electric force lines from the signal electrode 2 and the scanning electrode 1, and it is aimed at terminating the electric force lines from the signal electrode 2 and the scanning electrode 1 at the pixel electrode 3 in order not to affect the liquid crystal operation between the pixel electrode 3 and the counter electrode 4.

Furthermore, in accordance with the present embodiment, the width of the counter electrode 4 along the longitudinal direction of the signal electrode 2 was set at 8 µm, and at 6 µm along the longitudinal direction of the scanning electrode 1. A larger shielding effect can be achieved with the broader extending region of the counter electrode 4 off the scanning electrode 1.

In accordance with the present embodiment, as explained above, the black matrix 25 can be omitted. Accordingly, in addition to the advantages of the embodiment 1, the productivity can be increased. Additionally, because of the omission of the black matrix 25, the necessary precision of the alignment of the upper and lower substrate 11, 21 can be moderated, and the productivity can be improved further.

In accordance with the present invention, as explained above, the light shielding layer and the electrodes can be formed in the same processing step, because the light shielding layer and the counter electrode are formed on the same plane, taking the substrate as a standard. Accordingly, the processing steps can be simplified, and the productivity can be increased.

What is claimed is:

1. An active matrix type liquid crystal display which comprises:

a liquid crystal layer containing liquid crystal molecules;

a pair of substrates arranged to face each other with said liquid crystal layer being interposed therebetween;

a pair of polarizers arranged outside said substrates;

active elements composed of semiconductor active layers and insulating layers, having scanning electrodes and signal electrodes which are arranged between one of said pair of substrates and said liquid crystal layer;

pixel electrodes formed between one of said pair of substrates and said liquid crystal layer and being connected to said active elements;

light shielding layers arranged between one of said pair of substrates and said active elements in a manner facing the scanning electrode of said active elements for preventing said active elements from being illuminated by incident light; and counter electrodes arranged on the same plane as said light shielding layers;

wherein said counter electrodes and the light shielding layers are composed of the same metallic material.

2. An active matrix type liquid crystal display as claimed in claim 1, wherein at least one substrate of said pair of substrates is transparent, and said counter electrodes and said light shielding layers are composed of an opaque material having a smaller transmissivity than a transparent substrate of said pair of substrates.

3. An active matrix type liquid crystal display which comprises:

a liquid crystal layer containing liquid crystal molecules;

a pair of substrates arranged to face each other with said liquid crystal layer being interposed therebetween;

a pair of polarizers arranged outside said substrates; and active elements composed of semiconductor active layers and insulating layers, having scanning electrodes and signal electrodes which are arranged between one of said pair of substrates and said liquid crystal layer;

pixel electrodes formed between one substrate of said pair of substrates and said liquid crystal layer and being connected to said active elements;

light shielding layers arranged between the other substrate of said pair of substrates and said liquid crystal layer in a manner facing the scanning electrode of said active elements for preventing said active elements from being illuminated by incident light; and counter electrodes arranged on the same plane as said light shielding layers;

wherein said counter electrodes and the light shielding layers are composed of the same metallic material.

4. An active matrix type liquid crystal display which comprises:

a liquid crystal layer containing liquid crystal molecules;

a pair of substrates arranged to face each other with said liquid crystal layer being interposed therebetween;

a pair of polarizers arranged outside said substrates; and active elements composed of semiconductor active layers and insulating layers, having scanning electrodes and signal electrodes which are arranged between one of said pair of substrates and said liquid crystal layer;

pixel electrodes formed between one substrate of said pair of substrates and said liquid crystal layer and being connected to said active elements;

light shielding layers arranged between the other substrate of said pair of substrates and said liquid crystal layer in a manner facing the scanning electrode of said active elements for preventing said active elements from being illuminated by incident light; and counter electrodes arranged on the same plane as said light shielding layers;

wherein at least one substrate of said pair of substrates is transparent, and said counter electrodes and said light shielding layers are composed of an opaque material having a smaller transmissivity than a transparent substrate of said pair of substrates.

* * * * *